Nov. 7, 1972  J. C. SCHULZ  3,702,178
ENGINE MOUNT ASSEMBLY
Filed Nov. 17, 1971  2 Sheets-Sheet 1
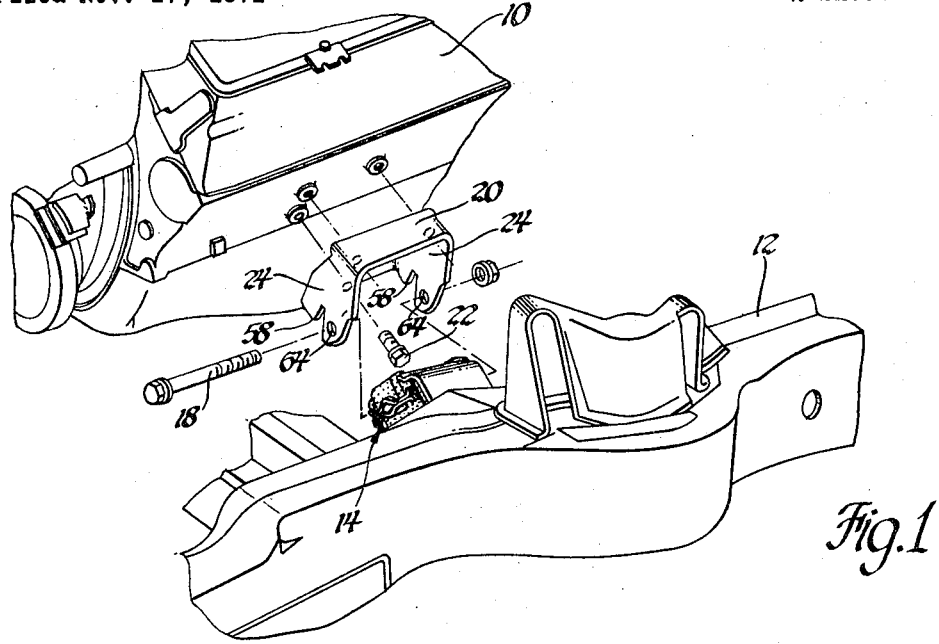
Fig.1
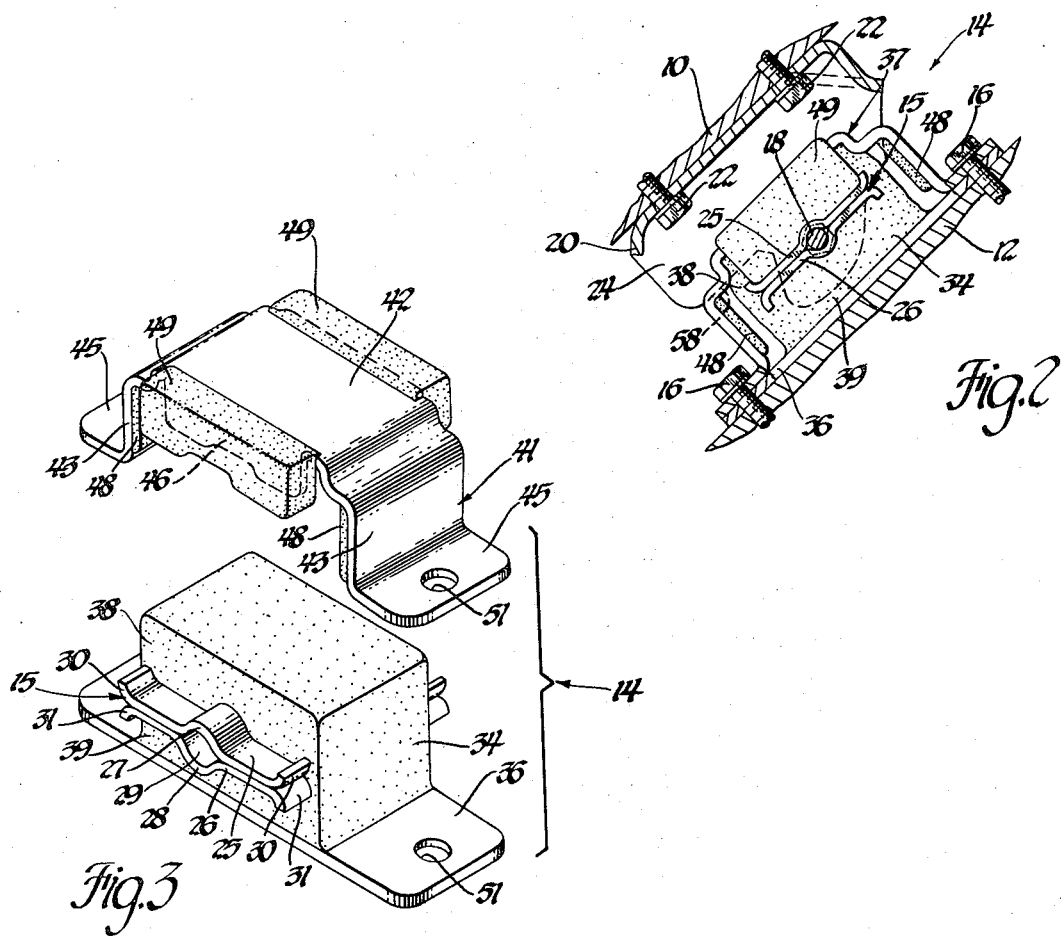
Fig.2
Fig.3

Nov. 7, 1972  J. C. SCHULZ  3,702,178
ENGINE MOUNT ASSEMBLY
Filed Nov. 17, 1971  2 Sheets-Sheet 2
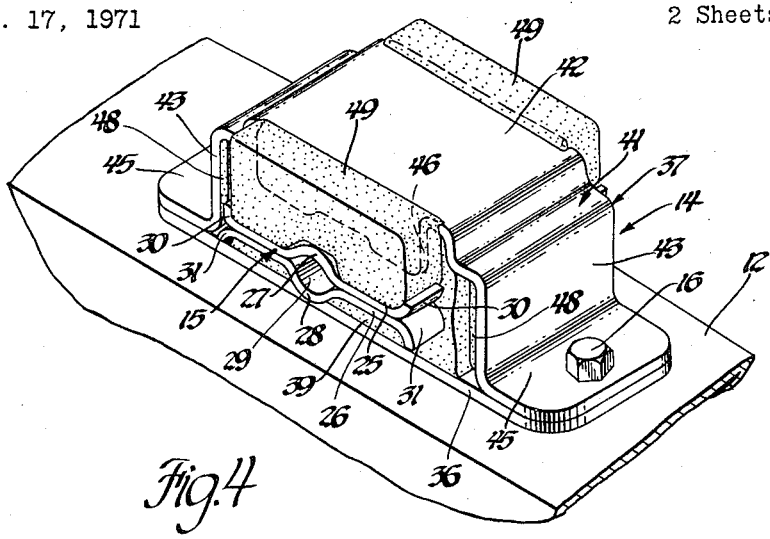
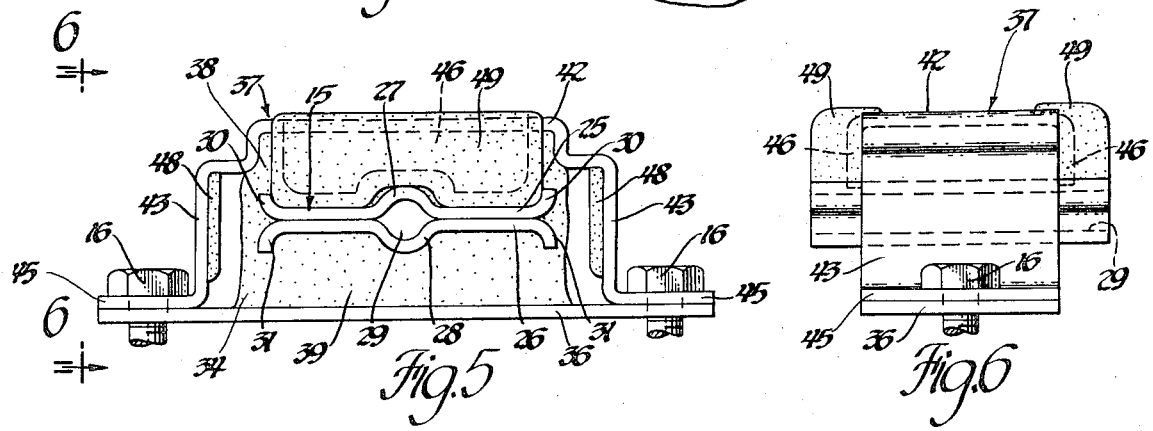
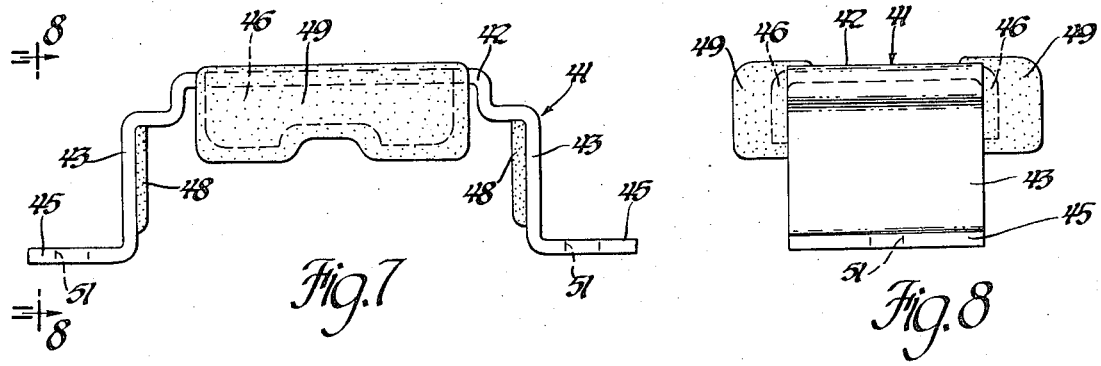
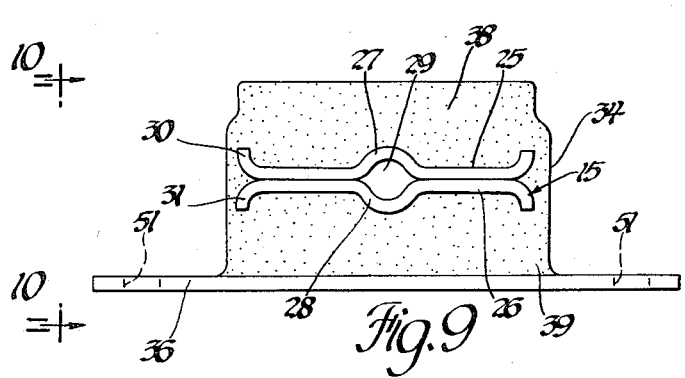
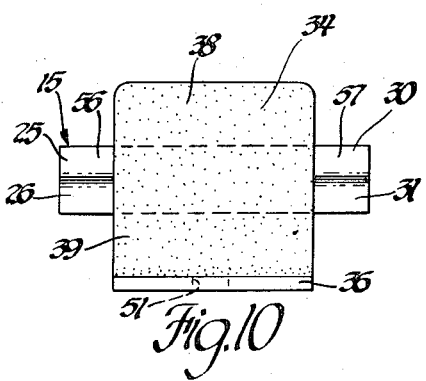

United States Patent Office 3,702,178
Patented Nov. 7, 1972

3,702,178
ENGINE MOUNT ASSEMBLY
John C. Schulz, Franklin, Ohio, assignor to General
Motors Corporation, Detroit, Mich.
Filed Nov. 17, 1971, Ser. No. 199,672
Int. Cl. B60k 5/12
U.S. Cl. 248—9
4 Claims

ABSTRACT OF THE DISCLOSURE

An engine mount assembly for resiliently supporting an engine on a frame of a motor vehicle includes a bracket and preloaded mount assembly comprising two subassemblies which are secured together and to the frame. In one subassembly, rubber is moulded about a bushing and bonded to a base plate with the bushing dividing the rubber into separate bodies for taking engine jounce. In the other subassembly, a U-shaped plate has rubber roll pads bonded thereto which will cooperate with the bushing to control engine roll and also has rubber fore and aft pads bonded thereto which will cooperate with an engine attaching bracket to control fore and aft engine movement. The two subassemblies are secured together and to the frame and preload the rubber molded about the bushing. The engine attaching bracket is attached to the engine, saddles the frame attaching bracket at the fore and aft pads and is pivotally secured to the bushing.

---

This invention relates to an engine mount assembly and more particularly to an engine mount assembly for resiliently supporting an engine on a frame of a motor vehicle to provide for jounce, fore and aft, and roll control of the engine relative to the frame.

Where an internal combustion engine powers a motor vehicle there are numerous vibrations set up such as jounce vibrations, fore and aft vibrations, and torque and torque reaction vibrations. It is customary practice to isolate these engine vibrations from the passenger compartment by using resilient motor mounts to support the engine on the frame and to a large extent the results have been very satisfactory. However, these vibrations will vary both in frequency and amplitude in different engine and vehicle combinations. Rather than a universal type engine mount that can be tuned for a particular application, it is common practice to employ different type mounts for the different applications to provide the desired vibration isolation characteristics. This is due in part to the common practice of using a single rubber compound which is dictated by the more conventional engine mount structure. The present invention is directed to providing a universal engine mount assembly capable of tuning for different jounce, fore and aft, and roll characteristics for the different engine and vehicle combinations while being simple in structure and inexpensive to manufacture.

The engine mount assembly according to the present invention includes a bracket and preload mount assembly comprising two subassemblies which are secured together to form a single preloaded unit. In one subassembly there is provided a bushing which is bonded by rubber to a bracket plate with the bushing being of a configuration to separate the rubber into separate bodies on opposite sides of the bushing. The other subassembly has a U-shaped bracket member with rubber roll stop pads bonded to its opposed interior sides and also rubber fore and aft pads bonded to fore and aft flange portions extending transverse to the bracket sides. The U-shaped bracket member is secured to the base plate and to the frame and loads the separate rubber bodies on opposite sides of the bushing in compression. The bushing is secured by a bolt to a bracket on the engine.

An object of the present invention is to provide a new and improved engine mount assembly for resiliently supporting an engine on a frame of a motor vehicle.

Another object is to provide an engine mount assembly for resiliently suupporting an engine on a frame of a motor vehicle to provide resilient engine mounting for jounce, fore and aft, and roll control and also to maintain connection between the engine and the frame with such operation being effected by separate bracket and preloaded mount subassemblies with one subassembly having a bushing separating a resilient body into separate regions for jounce and the other subassembly having both resilient roll pads and resilient fore and aft pads and with the jounce regions loaded in compression on assembly of these two subassemblies.

Another object is to provide an engine mount assembly for resiliently supporting an engine on a frame of a motor vehicle having two subassemblies with one subassembly having a bushing molded in resilient material for controlling engine jounce and another subassembly having both fore and aft resilient pads and roll pads for controlling fore and aft engine movement and engine roll movement respectively and with the two subassemblies cooperating to preload the resilient material about the bushing to maintain it in compression during all engine jounce.

Another object is to provide an engine mount assembly for resiliently supporting an engine on a frame of a motor vehicle wherein an engine attaching bushing is located in a frame attaching bracket and the bushing is molded in rubber to a detachable base section of the assembly and separates this rubber into two bodies which are loaded in compression on assembly and wherein the frame attaching bracket has rubber molded thereto for both fore and aft and roll control with the bushing and bracket also providing positive deflection limit stops for jounce, fore and aft, and roll movement.

These and other objects of the present invention will be more apparent from the following description and drawing in which:

FIG. 1 is a partially exploded, perspective view of an internal combustion engine resiliently supported on a frame of a motor vehicle by an engine mount assembly constructed according to the present invention;

FIG. 2 is an enlarged transverse sectional view of the engine mount assembly of FIG. 1;

FIG. 3 is an exploded perspective view of the engine mount assembly of FIG. 2;

FIG. 4 is a perspective view of the assembled mount assembly of FIG. 2;

FIG. 5 is an end view of the assembled engine mount assembly of FIG. 4;

FIG. 6 is a side view of the engine mount assembly taken along line 6—6 of FIG. 5;

FIG. 7 is an end view of the U-shaped bracket member of the engine mount assembly of FIG. 5;

FIG. 8 is a side view of the U-shaped engine bracket member taken along line 8—8 of FIG. 7;

FIG. 9 is an end view of the lower bracket member and bushing of the engine mount assembly of FIG. 5; and FIG. 10 is a side view of the lower bracket member and bushing taken along line 10—10 of FIG. 9.

Referring now to the drawing and particularly to FIG. 1, there is shown an internal combustion engine 10 which is supported at its opposite sides of a frame 12 of a motor vehicle by a pair of engine mount assemblies 14 constructed according to the present invention, there being only one engine mount assembly shown. The engine mount assembly 14 is generally of the bushing type and is secured to the frame by bolts 16 as shown in FIG. 2. The engine mount assembly 14 supports the engine 10 on the frame by its bushing 15 receiving a bolt 18 whose axis extends longitudinally of the engine and vehicle frame. The bolt 18 is supported near its opposite ends by an engine bracket 20 that is secured by bolts 22 to one side of the engine 10, the engine bracket 20 having a generally U-shaped configuration with legs or sides 24 that saddle the fore and aft ends of the engine mount assembly 14. Referring to FIGS. 2, 3 and 4, the bushing 15 is an assembly comprising an upper half member 25 and a lower half member 26 which are formed with semicircular central portions 27 and 28 extending the length of these bushing members. The semicircular portions 27 and 28 provide a central circular opening 29 which receives the mounting bolt 18. The bushing members 25 and 26 are also formed near their longitudinally extending edges to provide longitudinally extending rails or sides 30 and 31 that turn away from but are aligned with each other to provide roll stops as described in more detail later. The two bushing members 25 and 26 are rigidly secured together by spot welds at points on the abutting flat portions of these members intermediate the central opening 29 and the sides 30 and 31.

The engine mount assembly 14 comprises two subassemblies with one subassembly as shown in FIGS. 9 and 10 including the bushing assembly 15 about which is molded a body of resilient material 34 such as rubber. The resilient material 34 is bonded to a plate 36 which forms the lower half of a frame attaching bracket assembly 37 that is secured by the bolts 16 to the frame. The bushing 15 is located in the center of and extends the length of the resilient material 34 to separate this material into separate bodies 38 and 39.

The other subassembly as shown in FIGS. 7 and 8 includes an upper plate member 41 which has a U-shape with a flat top portion 42, sides or legs 43 and flanges 45. The top portion 42 is at right angles to the legs 43 and the legs 43 are at right angles to the flanges 45. The upper bracket member 41 further has flanges or rails 46 at its fore and aft ends which extend downward from the top portion 42 toward the interior of this member to provide for fore and aft deflection limit stops as described in more detail later. In this subassembly, pads 48 of resilient material such as rubber are bonded to the interior of the bracket legs 43 and pads 49 also of resilient material such as rubber are bonded to the fore and aft outer ends of the bracket flanges 46.

In assembling the two subassemblies of the engine mount assembly, the subassembly including the bushing 15 with its bracket plate 36 is first located on the frame 12 whereafter the other subassembly which includes the upper bracket plate 41 is then positioned thereover. These two subassemblies are then secured together and to the frame by the bolts 16 which fit through aligned holes 51 in the bracket members 41 and 36, there being one bolt on each side of the upper bracket member. The free heighth of the resilient material 34 is such that when the upper bracket member 41 is bolted in place, this body of resilient material is then loaded and thus its preload is applied after molding and during assembly of the subassemblies rather than having been molded in compression with a completely assembled bracket. It has been found that this eliminates shrinkage stresses and increases the fatigue life of the resilient material.

The engine mount assembly is arranged relative to the roll axis of the engine so that the resilient bodies 38 and 39 are in a position to resist engine roll in shear and engine jounce in compression, with the center bushing providing for a double load rate per unit deflection since the force required to deflect the bushing trapped between the two resilient bodies is double that of a simple sandwich type mount because as one body is loaded the other is unloaded. The opposite ends of the bushing 15 are provided with extensions 56 and 57 which extend sufficiently to engage lower edges 58 of the fore and aft legs 24 of the engine bracket 20 to aid in installing the bracket 20 with the engine over the frame attached engine mount assembly 14. That is, their engagement prevents the engine mount prior to insertion of the mounting bolt 18 through the aligned holes 64 and the opening 29 of the intermediately arranged engine mount bushing 15. It will be understood that there is another engine mount assembly like assembly 14 on the opposite side of the engine so that the engine is supported on the frame 12 at two points by mounting assemblies according to the present invention. These mounts act as the forward support of a mounting system which may be of the three point type which has an additional centrally located rearward mount, not shown, whose attachment is between a transmission secured to the engine and a cross-member of the frame.

With the engine bracket 20 saddling the engine mount assembly, the resilient fore and aft pads 49 are sandwiched between the upper bracket flanges 46 and the legs 24 of the engine bracket and the resilient pads 48 are located opposite the sides of 30 and 31 of the bushing. Thus engine movement in the fore and aft direction, the vertical direction and the roll direction is resisted by the resilient bodies of the mount assembly which by the arrangement of the parts always take such movement in compression. For example, both of the resilient bodies 38 and 39 are always in compression between the bushing 15 and the engine attaching bracket assembly 37 to control vertical engine movement during jounce and also to control rolling engine movement with the other resilient roll pads 48 being engaged by the bushing's sides 30 and 31 to limit such rolling engine movement. Fore and aft movement of the engine 10 is resisted by the resilient fore and aft pads 49 with one pad taking such movement in compression while the other is being unloaded. Thus, the engine mount assembly according to the present invention has positive deflection limit stops for engine movement in all directions which has the effect of preventing overstressing the resilient material with the result that the fatigue life is substantially extended. With this structural arrangement it will also be appreciated that the resilient materials may be of different compositions so as to obtain the desired characteristics for controlling engine movement in the various directions of motion and to dampen out various forms of vibration.

The above described embodiment is illustrative of the invention which may be modified within the scope of the appended claims.

I claim:

1. In an engine mount assembly for resiliently supporting an engine on a frame, first bracket means comprising a flat-shaped member and a U-shaped member which are securable to provide an elongated opening extending therethrough, means for securing said bracket members together and also in the installation, bushing means having depending wall portions, resilient material molded about said bushing means and bonded to one of said bracket members, said resilient material having a free dimension determined so that when both said bracket members with said resilient material bonded to said one bracket member are assembled said resilient material is held in compression between said bracket means and said wall portions of said bushing means on opposite sides of said bushing means whereby relative movement between said bushing means and said first bracket means in directions transverse to the axial direction of said bushing means is resisted by said resilient material while continuously in compression, the other of said bracket members having wall portions depending from opposite ends thereof in directions transverse to the opening through said first bracket means, second bracket means having wall portions saddling said wall portions of said other bracket member and also opposite ends of said bushing means, pivot pin means for pivotally connecting said bushing means to the wall portions of said second bracket means, said wall portions of said other bracket member and the opposing wall portions of said second bracket means having spaces therebetween, and resilient material bonded to said wall portions of said other bracket member for resiliently resisting movement of said second bracket means relative to said first bracket means in the axial direction of said bushing means.

2. In an engine mount assembly for resiliently supporting an engine on a frame, a first subassembly comprising a first bracket member, bushing means, resilient material molded about said bushing means and bonded on one side of said first bracket member, said bushing means having depending wall portions dividing said resilient material into separate bodies on opposite sides of said bushing means with one of said bodies intermediate one side of said bushing means and said one bracket member, a second subassembly comprising a second bracket member for extending over said resilient material including said bushing means and abutting said first bracket member, means for securing said bracket members, said second bracket member having an interior wall portion for engaging the side of said resilient material opposite said one side bonded to said first bracket member, said wall portion of said second bracket member spaced relative to said one side of said first bracket member so as to compress the resilient material on both sides of said bushing means on securing said second bracket member and said first bracket member so that said resilient material resists relative movement between said bracket members and said bushing means in the axial direction of said bushing means, and said second bracket member having wall portions at opposite ends depending therefrom in directions transverse to the axial direction of said first bracket member, and resilient material bonded to each of said depending end portions of said second bracket member.

3. In an engine mount assembly for resiliently supporting an engine on a frame, bushing means, first bracket means comprising a pair of members which cooperatively define an opening therethrough, means for connecting said bracket members, resilient material molded about said bushing means and bonded at one of two opposite sides to one of said bracket members with the other side arranged opposite an interior side of said other bracket member, said bushing means having depending wall portions dividing said resilient material into separate bodies on opposite sides of said bushing means, said resilient material having a free dimension greater than the corresponding dimension of said opening defined by said first and second bracket members so that said bodies are loaded in compression when said first and second bracket members are secured together; second bracket means having wall portions saddling opposite ends of said bushing means, pivot pin means for pivotally connecting said bushing means to said wall portions of said second bracket means, said other bracket member at opposite ends having depending wall portions arranged opposite said wall portions of said second bracket means, and resilient material bonded to each of said depending wall portions of said second bracket member and abutting the opposing wall portions of said second bracket means.

4. The engine mount assembly set forth in claim 3 and resilient material bonded to opposite interior sides of said other bracket member and engageable by said depending wall portions of said bushing means for limiting movement of said bushing means relative to said bracket means in directions transverse to the opposite interior sides of said other bracket member.

References Cited
UNITED STATES PATENTS

| | | | |
|---|---|---|---|
| 3,556,445 | 1/1971 | Werner | 248—7 |
| 3,565,373 | 2/1971 | Frye | 248—9 |
| 1,940,686 | 12/1933 | Lord | 180—64 R |
| 3,548,964 | 12/1970 | Krauss | 180—64 R |
| 1,779,235 | 10/1930 | Haushalter | 248—10 |

J. FRANKLIN FOSS, Primary Examiner

U.S. Cl. X.R.

180—64 R

PO-1050
(5/69)

UNITED STATES PATENT OFFICE
CERTIFICATE OF CORRECTION

Patent No. __3,702,178__   Dated __November 7, 1972__

Inventor(s) __John C. Schulz__

It is certified that error appears in the above-identified patent and that said Letters Patent are hereby corrected as shown below:

Column 4, line 5, after "gine" insert -- from proceeding downward past the engine --; line 21, delete "of" first occurrence.
Column 5, line 12, after "side" insert -- to one side --.

Signed and sealed this 29th day of May 1973.

(SEAL)
Attest:

EDWARD M. FLETCHER, JR.
Attesting Officer

ROBERT GOTTSCHALK
Commissioner of Patents